(12) United States Patent
Brandwine

(10) Patent No.: US 10,594,699 B2
(45) Date of Patent: Mar. 17, 2020

(54) PROVIDING ACCESS TO REMOTE NETWORKS VIA EXTERNAL ENDPOINTS

(71) Applicant: Amazon Technologies, Inc., Seattle, WA (US)

(72) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 15/997,330

(22) Filed: Jun. 4, 2018

(65) Prior Publication Data

US 2018/0288059 A1 Oct. 4, 2018

Related U.S. Application Data

(63) Continuation of application No. 15/093,403, filed on Apr. 7, 2016, now Pat. No. 9,992,203, which is a continuation of application No. 13/172,698, filed on Jun. 29, 2011, now Pat. No. 9,313,172.

(51) Int. Cl.
*H04L 29/06* (2006.01)
*H04L 29/08* (2006.01)

(52) U.S. Cl.
CPC ............ *H04L 63/101* (2013.01); *H04L 63/02* (2013.01); *H04L 63/0227* (2013.01); *H04L 63/0236* (2013.01); *H04L 63/0272* (2013.01); *H04L 63/0428* (2013.01); *H04L 63/10* (2013.01); *H04L 63/20* (2013.01); *H04L 67/10* (2013.01)

(58) Field of Classification Search
CPC ..... H04L 63/0236; H04L 63/02; H04L 63/20; H04L 63/10; H04L 67/10; H04L 63/0272; H04L 63/0428; H04L 63/101; H04L 63/0227
See application file for complete search history.

(56) References Cited

U.S. PATENT DOCUMENTS

2002/0129271 A1* 9/2002 Stanaway, Jr. ...... H04L 63/0263
726/15

* cited by examiner

*Primary Examiner* — Tri M Tran
(74) *Attorney, Agent, or Firm* — Knobbe, Martens, Olson & Bear, LLP

(57) ABSTRACT

Systems and methods for providing access to a remote network via an external endpoint are provided. A client establishes a secure connection between an external endpoint and a remote network. Transmissions from clients to the external endpoint are supplemented with additional information regarding handling within the remote network, and then transmitted to an internal endpoint within the remote network. The internal endpoint processes the transmission based on the supplemental information and returns a response to the external endpoint. A response is then returned to the client. Access policies may be created by authorized users to establish processing of client transmissions. These policies may be stored and enforced by the internal endpoint or the external endpoint.

20 Claims, 6 Drawing Sheets

PROVIDING ACCESS TO REMOTE NETWORKS VIA EXTERNAL ENDPOINTS

CROSS-REFERENCE TO RELATED APPLICATION

This application is a continuation of U.S. patent application Ser. No. 15/093,403, entitled PROVIDING ACCESS TO REMOTE NETWORKS VIA EXTERNAL ENDPOINTS, and filed Apr. 7, 2016, which is a continuation of U.S. patent application Ser. No. 13/172,698, entitled PROVIDING ACCESS TO REMOTE NETWORKS VIA EXTERNAL ENDPOINTS, and filed Jun. 29, 2011, now U.S. Pat. No. 9,313,172, the entireties of which are hereby incorporated by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center.

Data centers may be private data centers operated on behalf of an organization or public data centers operated on behalf, or for the benefit of, the general public. Additionally, some data centers or computing resources within data centers may operate with mixed private and public functionality. For example, a resource within a data center may allow limit public access to the resource, while allowing full access only to entities associated with an organization. In some scenarios, an organization may wish to manage how users access data center resources.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
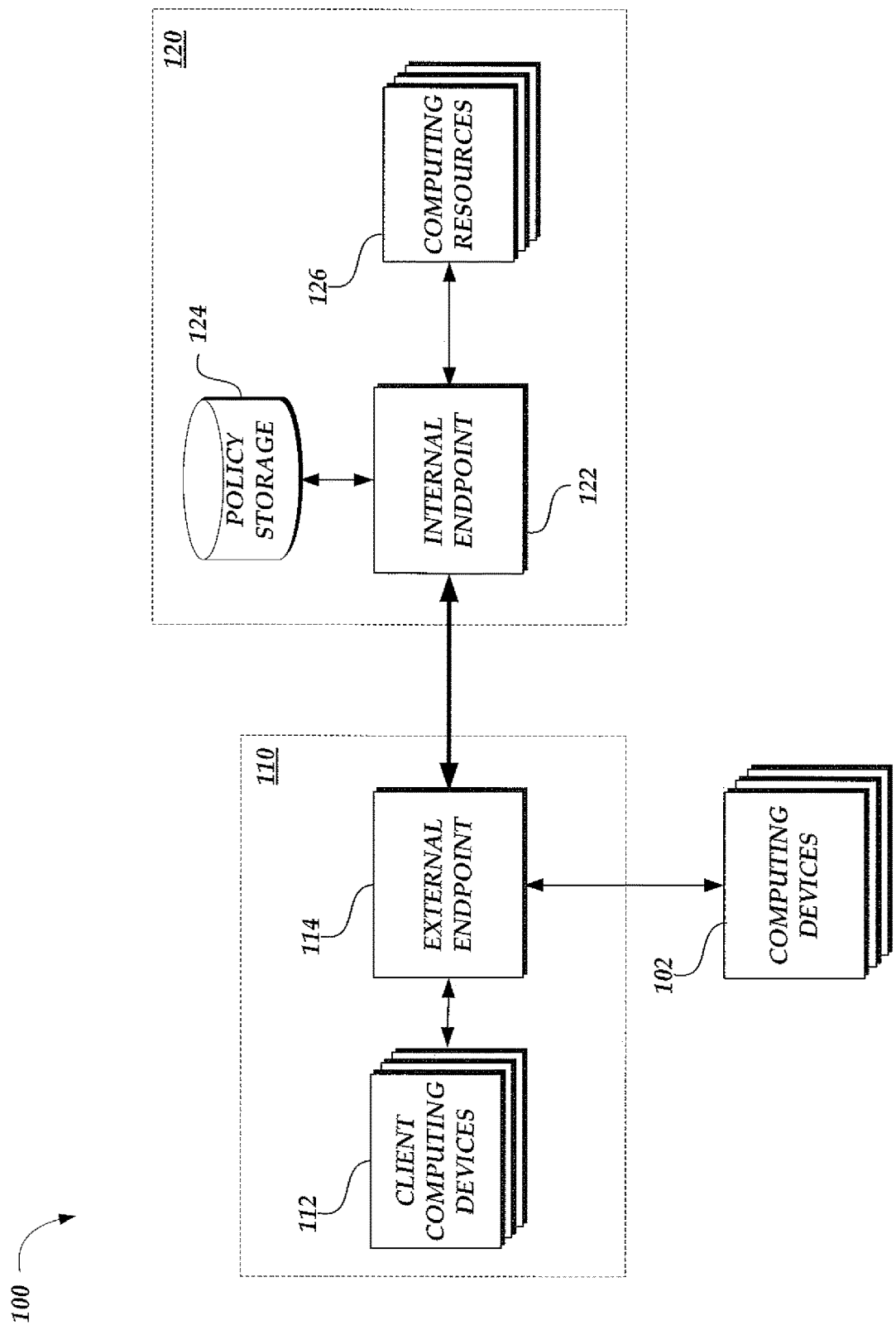
FIG. 1 is a block diagram depicting an illustrative environment for providing access to a remote network via an external endpoint, including private networks, an external endpoint, and remote networks.

Generally described, aspects of the present disclosure relate to providing access to remote networks. Specifically, systems and methods are disclosed for establishing endpoints at various networks that facilitate access to remote network resources, generally referred to as "external endpoints." In an illustrative embodiment, the external endpoints can be configured to provide supplemental information to requests generated by computing devices in the networks prior to prior to transmitting the requests to the remote network. Systems and methods are disclosed for enforcing access policies within the remote network according to information provided by an external endpoint.

In one aspect, a client authorizes the creation of an endpoint external to that remote network. Illustratively, the external endpoint may be a computing device within a private network of the client that is configured to receive requests transmitted from computing devices associated with the private network. The client may further specify access policies to be enforced on the remote network. For example, the remote network may allow public read access to a resource within the remote network, but may only allow write access to that resource via the external endpoint. As a further example, the remote network may only allow access to a resource within the remote network where a client request has already been authenticated by the external endpoint.

The client may then configure a computing device as the external endpoint, and create a secure connection between the external endpoint and the remote network. The external endpoint can be further configured to provide processing of client requests, which can include the addition of supplemental information to the requests. Specifically, in one aspect, the external endpoint processes these requests by determining supplemental information associated with routing the request within the remote network. Illustratively, supplemental information may be associated with the client computing device that submits a request, such as that computing device's address on a private network, an identifier associated with the private network, and the like. By way of further example, supplemental information may be associated with authentication methods, such as a successful authentication on a private network.

An internal endpoint within the remote network receives the request, and processing the request according to the supplemental information. Illustratively, processing the request may correspond to determining whether the request complies with access policies based on the supplemental information. The processing may further correspond with forwarding the request to a computing device within the remote network, such as a database service. Based on processing the request, the internal endpoint obtains a response, which is transmitted to the external endpoint via the secure network connection. The external endpoint may then transmit the response to the requesting client.

Specific embodiments, example applications, and illustrative interfaces of the present disclosure will now be described with reference to the drawings. One skilled in the art will appreciate that the disclosed embodiments and examples need not be implemented in combination. Additionally, the disclosed embodiments and example applications are intended to illustrate, and not limit, the present disclosure.

FIG. 1 is a block diagram depicting an illustrative environment 100 for providing access to a remote network 120 via an external endpoint 114. The illustrated environment includes a private client network 110, a remote network 120, and multiple computing devices 102 not included within either the private client network 110 or the remote network 120. Illustratively, remote network 120 implements a service accessible by at least the external endpoint 114.

The private client network 110 includes multiple client computing devices 112 in communication with an external endpoint 114. The external endpoint may, for example, be a physical computing device. In some embodiments, the external endpoint 114 may be a virtual computing device loaded onto a physical computing device. The external endpoint is operable to allow interaction between the client computing devices 112 and a remote network 120, with which the external endpoint is in communication. In some embodiments, requests may be directed to the external endpoint in the same manner as a request may otherwise be directed to the remote network 120. For example, the remote network 120 may generally provide an application programming interface (API) with which clients may interact with computing devices on the remote network 120. Where an external endpoint 114 is configured, the same API calls which would generally be transmitted directly to the remote network 120 may instead be transmitted to the external endpoint 114. The external endpoint 114 may then facilitate processing of the API call on the remote network 120. In some embodiments, the remote network may be configured to accept requests, such as API calls, only from the external endpoint 114. In other embodiments, requests to the remote network 120 may be processed differently based on whether they were passed to an external endpoint 114.

The external endpoint 114 is further in communication with the computing devices 102. Illustratively, computing devices 102 may be additional client computing devices not directly associated with the private client network 110. In some embodiments, the external endpoint 114 may be operable to handle requests from computing devices 102 differently than requests from client computing devices 112, to reflect their location outside the private client network 110.

Illustratively, the external endpoint 114 and the remote network 120 are connected via one or more communication protocols. For example, the connection between the external endpoint 114 and the remote network 120 may be facilitated via a secure network connection, such as a Virtual Private Network (VPN) connection. This secure network connection may be routed via other private or public networks, such as a LAN, WAN, or global communications network. Communication between the external endpoint 114 and the remote network 120 may be encrypted or otherwise protected, such as by use of the Internet Protocol Security (IPsec) suite, or by use of Transport Layer Security (TLS) or Secure Sockets Layer (SSL) protocols. Additional methods of establishing a secure network connection between two points on distinct networks will be apparent to one skilled in the art.

The remote network 120 includes multiple computing resources 126 in communication, directly or indirectly, with an internal endpoint 122. Illustratively, these computing resources 126 may correspond to resources available to client computing devices. In some embodiments, these resources may implement service available to client computing devices. These resources may include data storage resources, web servers, or other network accessible resources. In some embodiments, computing resources 126 may be physical computing devices configured to provide specific functionality or processing to the client computing devices 112. In other embodiments, each computing resources 126 may correspond to a virtual computing device, such that multiple virtual computing devices may operate from a shared physical computing device. In still more embodiments, a computing resources 126 may correspond to a virtual computing device accessing multiple physical computing devices 126. Similarly, the internal endpoint 122 may be a physical computing device, such as a router, or a virtual computing devices operating from a physical computing device.

Although the internal endpoint 122 and computing resources 126 are illustrated as separate logical devices, in some embodiments, the computing resource 126 and the internal endpoint 124 may be implemented in combination. For example, a computing device (either physical computing device or virtual machine instance), may be configured in the remote network 120 to receive client computing device requests and to provide the requested or appropriate processing responsive to the requested. In this embodiment, the combined internal endpoint 122 and computing resources 126 may not route any portion of the client computing device request to other computing resources 126. Alternatively, the combined internal endpoint 122 and computing resources 126 may still route at least some portion of the client computing device request to additional or alternative computing resources 126.

As described above, the internal endpoint 122 is in communication with the external endpoint 114 of the client private network 110 via a secure network connection. In some embodiments, the internal endpoint 122 may be in communication with multiple external endpoints 114. The internal endpoint 122 is further in communication with a policy storage 124, which holds access policy information. This access policy information may be used by the internal endpoint to determine how to route a received client request. Illustratively, policy storage 124 may include information specifying that only requests from client computing devices 112 within the client private network 110 should be given access to computing devices 126 within the remote network. On receipt of a request, the internal endpoint 122 may use information included in the request and the stored policy information (from policy storage 124) to determine how to process the request. Policy storage 124 may correspond to a hard disk drive, either internal or external to a computing device, to network accessible storage, or to other storage devices accessible by the internal endpoint 122.

Figure 2A:
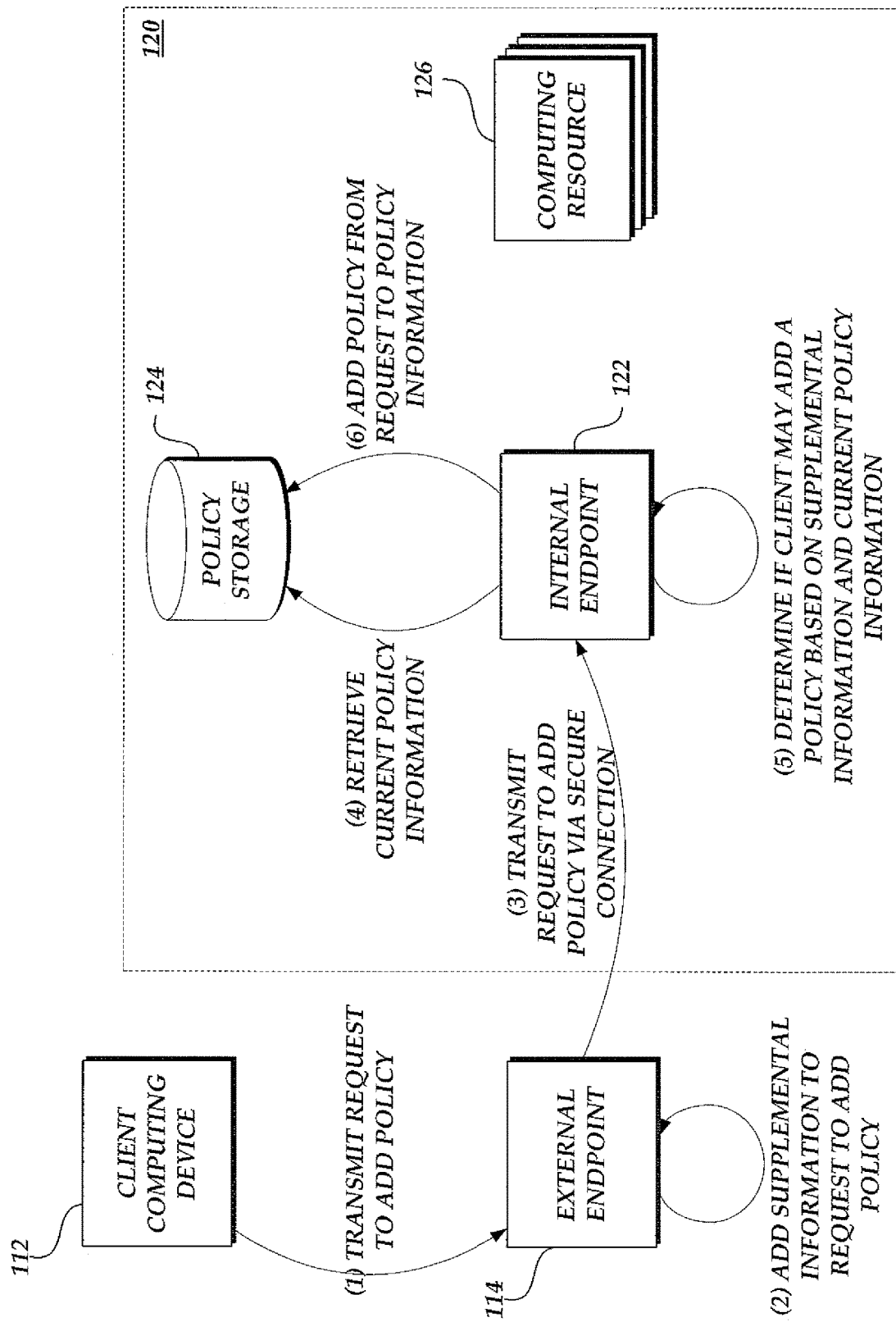
FIG. 2A is a block diagram of the remote network access environment of FIG. 1 illustrating the transfer of policy information associated with accessing a remote network via an external endpoint.

With reference to FIG. 2A, an illustrative interaction for creating a new policy for accessing a remote network 120 will be described. Illustratively, a policy may include information specifying how a client of a remote network 120 or a computing resource 126 on the remote network 120 would like to handle requests directed to the remote network 120. For example, a client may wish to implement a policy allowing only requests from the external endpoint 114 to be processed by the remote network 120. As a further example, a client may wish to specify that requests received at the remote network 120 from the external endpoint 114 should be treated differently to similar or identical requests transmitted to the remote network 120 without use of the external endpoint 114.

As illustrated in FIG. 2A, the client computing device 112 may transmit a request to add new policy information to the external endpoint 114. Illustratively, the new policy information may include information specifying how the remote network 120 should process subsequent incoming requests based on request information. The subsequent request information may, by way of non-limiting example, correspond to a incoming port range of the subsequent request, a protocol of the subsequent request, the source address of a subsequent request, whether the subsequent request is received via an external endpoint, and a destination of the request. One illustrative example for a user interface through which a client computing device may create a request to add a new policy will be discussed with respect to FIG. 3, below. In some embodiments, the request to add a new policy from the client computing device 112 may be transmitted to the external endpoint 114 by way of an application programming interface (API). In other embodiments, the request to add a new policy may be transmitted via other mechanisms, such as via GET or POST commands, or other transmission protocols.

In this illustrative example, after receiving the request to add a new policy from the client computing device 112, the external endpoint 114 adds supplemental information to the request. As discussed above, the supplemental information may be used by the internal endpoint to determine routing within the remote network 120. The supplemental information may further be used to determine whether the client computing device 112 is authorized to create new policies. The supplemental information is not required to alter the policy information in the request. In the current example, the external endpoint 114 may add supplemental information to the request indicating that it is a request to add a new policy, and should be processed by the internal endpoint and added to the access policy information within policy storage 124. The external endpoint may further add supplemental information identifying the source of the new policy request (e.g., network address, port, etc.). Still further, the external endpoint may add supplemental information specifying whether the external endpoint has authenticated the client computing device 112, such as by use of federated identity authentication As described above with respect to FIG. 1, external endpoint 114 and internal endpoint 120 are in communication via a secure network connection, such as a VPN connection. After supplementing the new policy request, the new policy is transmitted to the internal endpoint 122 via this secure connection.

In this illustrative embodiment, subsequent to receiving a request to add a new policy, the internal endpoint 122 retrieves current policy information from policy storage 124. In some embodiments, the internal endpoint 122 may be operable to retrieve current policy information from policy storage 124 prior to receiving a request to add a new policy. The internal endpoint 122 can utilize the retrieved current policy information in conjunction with the supplemental information included within the new policy request to determine whether to add the new policy request to the policy storage 124. For example, the current policy information may specify that only new policy requests which are transmitted via the external endpoint 114 will be accepted and added to the policy storage 124. In other embodiments, the current policy information may specify that only new policy requests from client computing device 112 will be accepted. In still more embodiments, current policy information may specify other metrics for determining whether to accept a request to add a new policy based on supplemental information.

If it is determined that a new policy should be accepted, the internal endpoint 122 may add the new policy information from the request to the policy storage 124. In some embodiments, the new policy information may be stored in addition to the previous policy information. In other embodiments, a new policy request may function to replace current policy information. In some embodiments, the internal endpoint 122 may be operable to return an acknowledgement to the external endpoint 114 that the new policy has been successfully stored. For example, the internal endpoint 122 may transmit an identifier of the newly stored policy to the external endpoint 114. The external endpoint may, in turn, transmit such an acknowledgment to the client computing device 112. Subsequent to storing the new policy information, the illustrative interaction depicted in FIG. 2A may end.

Figure 2B:
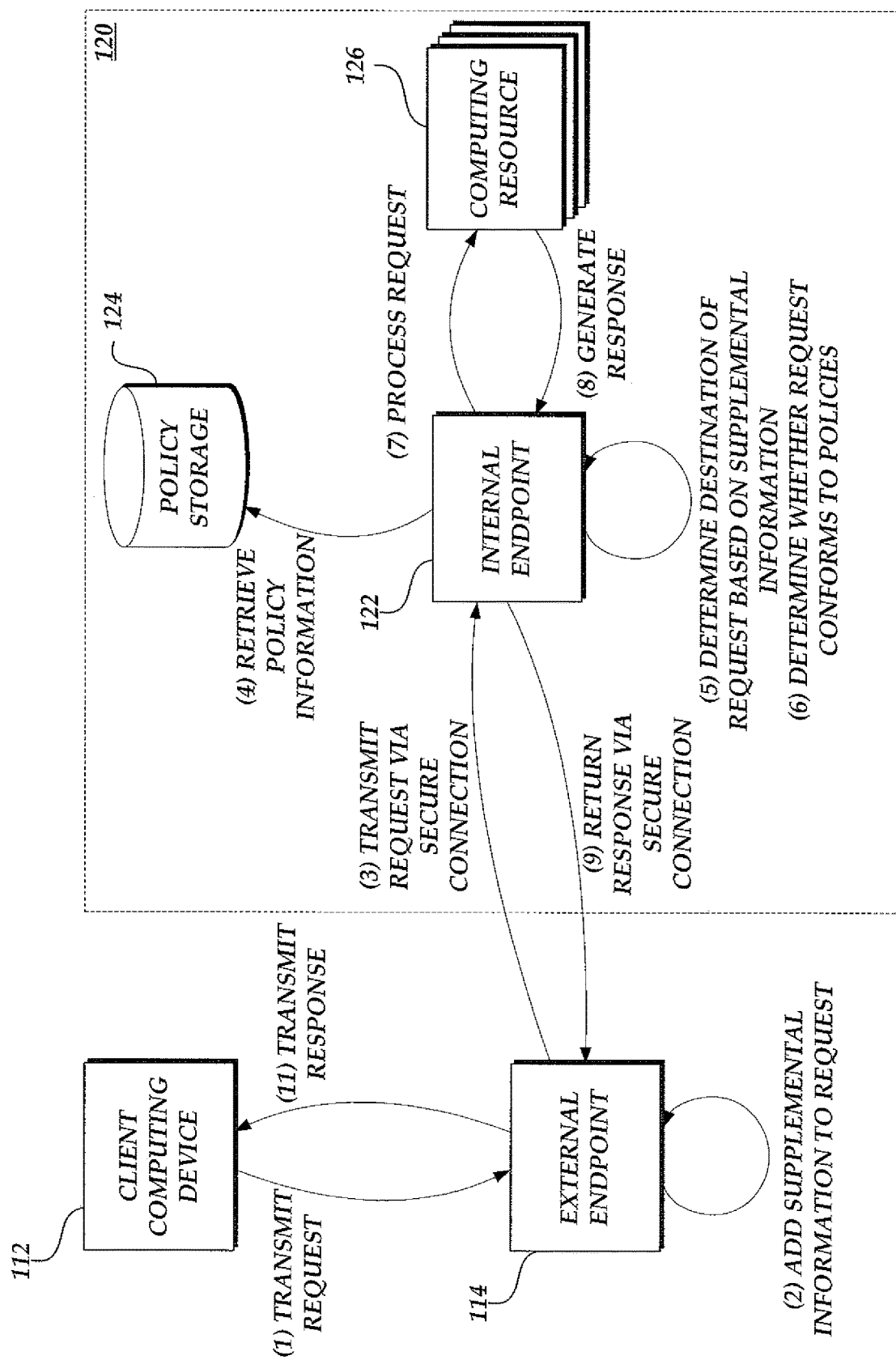
FIG. 2B is a block diagram of the remote network access environment of FIG. 1 illustrating the transmission of a request from a client computing device to the remote network via an external endpoint.

With reference now to FIG. 2B, an illustrative interaction for processing a request to access a computing resource 126 on a remote network 120 will be described. As illustrated in FIG. 2A, the client computing device 112 transmits a request to the external endpoint 114. This request corresponds to a request to interact with the remote network 120. This request may be similar or identical to a request which could be transmitted directly to the remote network 120. In some embodiments, the request may initially be addressed directly to the remote network 120. In these embodiments, the external endpoint 114 may be operable to intercept requests to the remote network 114 which originate on the private client network 110. In this illustrative example, the request is a request to access a remote resource 126. As described above, the remote resource 126 may be a database server, a web server, or other computing resource accessible via a remote network. As a further example, the request may be a request to access and alter information from a remote data storage device hosted by computing resource 126. Though a request from a client computing device 112 is discussed here for the purposes of example, a request may, in some embodiments, be transmitted from a client computing device outside the client private network 110, such as from a client computing device 102.

After receiving the request from the client computing device 112, the external endpoint 114 supplements the request with supplemental information. This supplemental information allows the internal endpoint 122 to properly process the request on the remote network 120. In some embodiments, the supplemental information may be used to determine whether a request conforms to access policies described in policy storage 124. For example, the supplemental information may describe characteristics of the request or of the client computing device 112, such as the port on which the request was received at the external endpoint 114 or an address of the client computing device 112. In some embodiments, the supplemental information may describe the endpoint at which the request was received. For example, a particular computing resource 126 (e.g., a database server) may only be accessible when requests are transmitted via a unique external endpoint. In these examples, the unique external endpoint may then include supplemental information verifying that the request was transmitted by that unique external endpoint.

Subsequent to adding supplemental information to the initial client request, the external endpoint 114 transmits the supplemented request to the internal endpoint 122 via a secure connection. In some embodiments, the external endpoint 114 may be operable to determine whether a secure network connection to the internal endpoint 122 exists. In these embodiments, where a secure network connection does not exist, the external endpoint 114 may further be operable to establish a secure network connection to the internal endpoint 122. As described above, the secure network connection may be any connection capable of securely transmitting the supplemented request to the remote network 120, such as a VPN connection. The secure network connection may require additional information to be added to a request for the purposes of using the secure network connection. This additional information required by the secure network connection is distinct from the supplemental information added to the initial request by the external endpoint 114. In some embodiments, the client computing device 112 may be unaware that the request is transmitted to the remote network 120. In still more embodiments, the supplemental information may be transmitted separately from the initial client request. For example, the external endpoint 114 may transmit the initial client request to the internal endpoint 122 via the secure connection without including the determined supplemental information. The external endpoint 114 may then transmit the supplemental information separately from the initial client request. Those the initial client request and the supplemental information are described for the purposes of example herein as combined into a supplemented request, one skilled in the art will appreciated that both may be passed to the remote network 120 individually or in combination.

After receiving a supplemented request from the external endpoint 114, the internal endpoint 122 retrieves policy information from policy storage 124. As described above with respect to FIG. 2A, in some embodiments, the internal endpoint may retrieve policy information from policy storage 124 prior to receiving a supplemented request. As will be appreciated by one skilled in the art, the internal endpoint 122 may retrieve policy information from policy storage 124 at any point before further processing the request, as will be described below.

Subsequent to receiving a supplemented request and retrieving policy information, the internal endpoint 122 processes the request by determining an appropriate destination of the request. An appropriate destination may be a computing resource within the remote network, such as computing resources 126. In some embodiments, the client computing device 112 may be unaware of the routing within the remote network 120. For example, as described above, a remote network 120 may implement one or more virtual computing devices within the computing resources 126. These virtual computing devices may, in turn, emulate virtual networking configurations between the virtual computing devices. As such, the apparent emulated destination as seen by the client computing device 112 may differ from the actual physical destination determined by the internal endpoint 122. In some embodiments, a request may be processed by transmitting the request to a destination outside of the remote network 120, such as to an additional resource which resides on another network. The client computing device 112 may be further unaware of such external transmission.

In order to determine the appropriate destination of a request, the internal endpoint 122 may use supplemental information included within the request. For example, the supplemental information may include that the request is directed to a database controlled by a user of the client computing device 112. The supplemental information may include further information identifying or authenticating that user. The internal endpoint 112 may use this supplemental information to determine a location at the remote network 120 of the client's database. In some embodiments, determining an appropriate destination of a request may include determining how to process the request on the remote network. For example, determining an appropriate destination may include determining a routing of the request or a priority of the request. In some embodiments, clients of the remote network 120 may have differing priorities to networking resources or computing resources of the remote network 120. In these embodiments, the supplemental information included in the request may reflect the priority level associated with the client. The internal endpoint 1 112 may use such priority information to determine a routing within the remote network 120. For example, where the priority of a request is low, a slower or less costly routing within the remote network 120 may be determined. Where a request has a high priority, a more costly or faster routing may be determined. The priority associated with a client may be reflected of service level agreements between the remote network 120 and the client. In other embodiments, the priority of a request may be independent of the client. For example, a request may be marked as "urgent" by the generating client computing device 112, and therefore be given a higher priority. In some embodiments, the priority of a request may be a combination of the client's priority and the priority assigned to the request by the generating client computing device 112.

In some embodiments, the supplemental information may not be necessary to determine an appropriate destination of a request. For example, where an external endpoint 114 has access to only one computing resource 126 within the remote network 120, all requests from that external endpoint 114 may be determined to be directed to that computing resource 126. In other embodiments, the supplemental information may include information identifying the source external endpoint 114, and therefore supplemental information may be used to determine an appropriate destination. In still more embodiments, an internal endpoint may be linked to particular computing resource 126 within a remote network 120. As such, all requests to the internal endpoint may be routed to that particular computing resource 126.

In addition to determining an appropriate destination of a request, the internal endpoint 122 may further determine whether the request complies with the access policies retrieved from the policy storage 124. Additionally, as previously described, in some embodiments, the computing device functioning as the internal endpoint 122 may also function as the computing resource 126. In these embodiments, the above-described determination of an appropriate destination may be omitted, with the internal endpoint 122 can determine whether the request complies with the access policies retrieved from the policy storage 124 responsive to the receipt of the request from the client computing device 112.

As will be described below with respect to FIG. 3, access policy information may set rules for accessing a computing resource 126 on the remote network 120. Access policies or rules may further define who or how access policy information is modified or updated. For example, a particular authentication method may be required to access a computing resource 126. This authentication method may correspond to use of a user name and password, to use of federated authentication methods, or to other authentication. The internal endpoint 124 may compare the supplemental information contained in the request to the authentication required by the access policies to determine whether the request may be processed. If the supplemental information contains the required authentication, the request would then be processed. Otherwise, the request would be denied. In some embodiments, denial of a request may further include returning a response indicating an error to either the external endpoint 114 or the client computing device 112 which generated the request. As will be discussed below with respect to FIG. 4, in some embodiments, the external endpoint 112 may also be operable to determine whether a request complies with access policies.

Though described above individually, in some embodiments, determining an appropriate destination of a request may be accomplished simultaneously to determining whether the request conforms to access policies stored within the policy storage 124. For example, access policies, in some embodiments, may include information on how to route a request to an appropriate destination based on supplemental information in the request. In other embodiments, determination of an appropriate destination may be distinct from determining whether a request conforms to the stored access policies.

Subsequent to determining an appropriate destination of a request and whether the request conforms to stored access policies, the internal endpoint 122 processes the request within the remote network 120. Where the appropriate destination is distinct from the internal endpoint 122, processing the request may include transmitting the request to a distinct computing device within the remote network, such as a computing resource 126. As previously discussed, in other examples, the request may be processed by the internal endpoint 122. For example, as shown in FIG. 2B, a request to alter an access policy may not request transmission of the request to a distinct computing device. In addition, processing the request may require additional processing based on the nature of the request. For example, where a client request is a request to alter a database hosted by a computing resource 126, processing may require transmission to that computing resource 126. In addition, processing may require the computing resource 126 to modify the appropriate database or otherwise process information included in the request.

As described above, in some embodiments, computing resource 126 and internal endpoint 122 may be implemented by the same device. In some such embodiments, internal endpoint 122 may be configured to process requests directed to the computing resource 126 which is implemented on the same device as internal endpoint 122. In these embodiments, internal endpoint 122 may also process requests to alter or access policy information. In some such embodiments, an external endpoint 114 may also be configured to access a single internal endpoint 122. In this way, an external endpoint 114 may be limited to accessing a single computing resource 126 on the remote network 120. Such implementations may simplify configuration and reduce the need for routing within the remote network 120.

For the purposes of illustration, it is assumed in this example that processing the request on the remote network 120 generates a response to the request by the appropriate computing resource 126. In other embodiments, the request may generate no response by the remote network 120. In these embodiments, the illustrative interaction demonstrated by FIG. 2B may then end.

In embodiments where a response to the initial client request is generated, the response is obtained by the internal endpoint 122. In the example depicted by FIG. 2B, this response is generated by a computing resource 126 and transmitted to the internal endpoint 122. In other embodiments, the internal endpoint 122 may generate the appropriate response.

After obtaining the response, the internal endpoint 122 returns the response to the external endpoint 114 via the secure network connection. In some embodiments, the internal endpoint 122 may be operable to confirm that the secure network connection with the external endpoint 114 has been maintained. Where a secure network connection no longer exists to the external endpoint 114, the internal endpoint may be operable to establish such a secure network connection.

After receiving the response via the secure connection, the external endpoint 114 transmits the response to the initial client request to the client computing device 112. The illustrative interaction depicted in FIG. 2B may then end.

Figure 3:
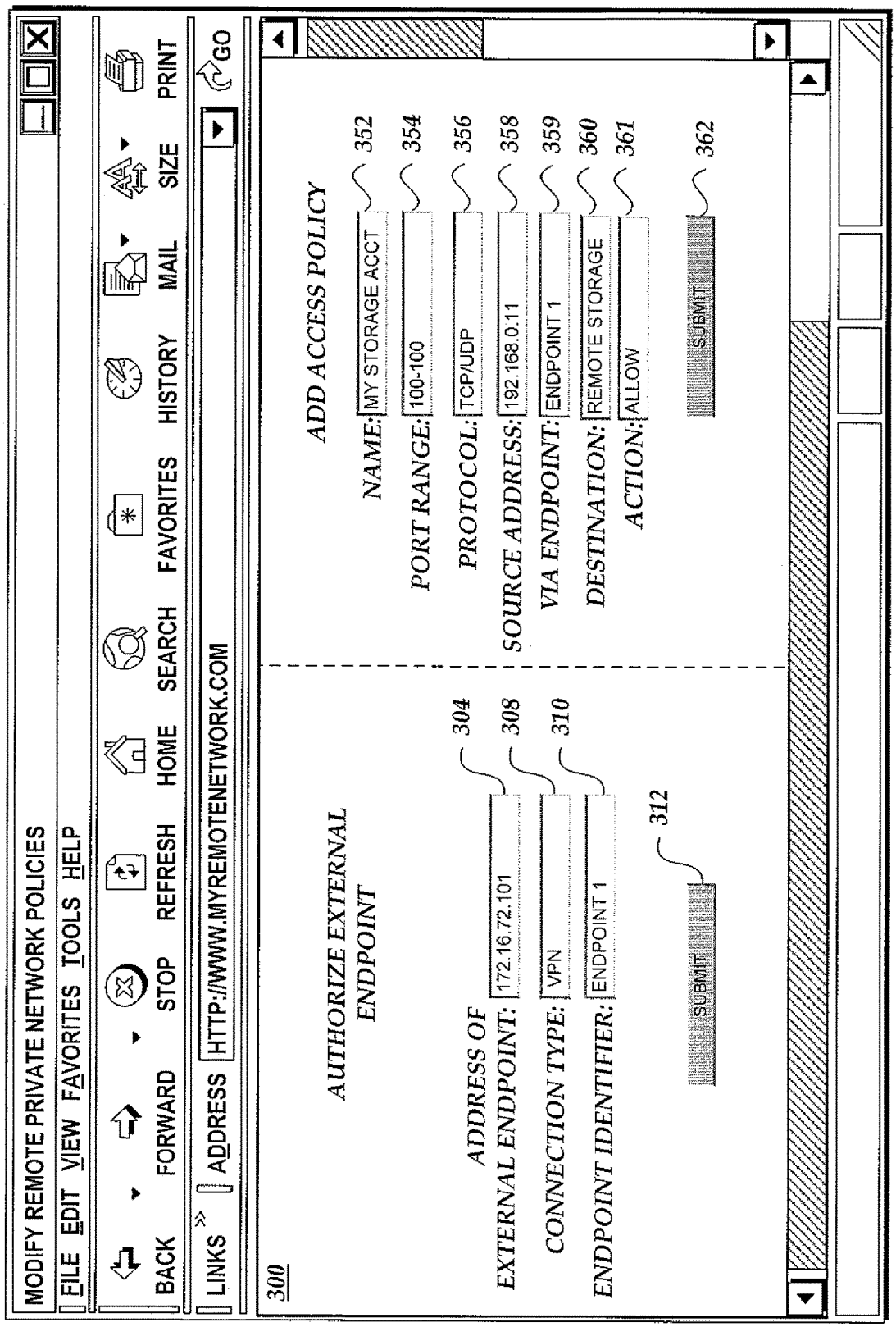
FIG. 3 is an illustrative user interface displaying a submission form for use in creating an authorized external endpoint and policy associated with that external endpoint.

With reference to FIG. 3, one example of a user interface for authorization of an external endpoint or addition of an access policy will be discussed. Illustratively, this user interface could be presented to any client computing device, such as client computing devices 112 or 102 of FIG. 1. As shown in FIG. 3, interface window 300 allows a user to input both information corresponding to the creation of an authorized external endpoint or information corresponding to access policies which should be enforced by the remote network. Input fields 304-310 correspond with information authorizing a new external endpoint. Illustratively, this information may specify a specific network address on which the external endpoint must exist. This address may, for example, be an Internet Protocol (IP) address which is accessible on a global communications network. The information may further specify the connection type which must be established between the remote network and the authorized external endpoint. For example, an external endpoint may be required to use a VPN connection to communicate with the remote network. Additionally, an endpoint identifier may be specified, such that the authorized endpoint's identifier may be used to subsequently craft access policies for accessing the remote network over the external endpoint. Additional information may be specified in order to authorize an external endpoint. For example, further information may be specified for use in establishing a secure network connection, such as a username and password used to establish the connection. A client computing device may submit the entered information to the remote network by selecting submit button 312. A client computing device identified by the submitted information may then establish itself to the remote network as an external endpoint. In some embodiments, additional measures may be required to establish a computing device as an external endpoint. For example, the remote network may provide software which must be loaded on to the client computing device before the computing device can function as an external endpoint. A request to create an authorized external endpoint may be received on the remote network 120 via a previously authorized external endpoint, or directly to the remote network 120. In some embodiments, a request to create an external endpoint must be authenticated before being accepted by the remote network 120.

In addition to authorizing a computing device to function as an external endpoint, interface window 300 may also allow addition of access policies to be enforced by the remote network. Information fields 352-361 illustrate information which may be utilized in order to create such an access policy. Information field 352 allows the input of a name for a newly created access policy. Such a policy name may assist a client in identifying the access policy in the future. For example, an interface may be providing to the client which allows the selective editing of access policies based on a selected policy name. Information field 354 allows the specification of a port range to which a request is directed. Illustratively, this port range may be associated with ports specified by the Internet Protocol Suite, such as Transmission Control Protocol (TCP) or User Datagram Protocol (UDP) port ranges. In some embodiments, a source port range may be specified. Information field 356 may specify a protocol of an incoming request. Illustratively, such a protocol may be TCP, UDP, or other transport protocols. In some embodiments, additional protocols may be specified, including but not limited to Secure Shell (SSH), TLS/SSL, or Stream Control Transmission Protocol (STCP). Information field 358 may specify a source address from which a request originates. Illustratively, this may be an IP address which is local to a private computing network. In other embodiments, a source address may be an IP address of a global communications network. In still more embodiments, the source address may consist of other identifying information, such as a Media Access Control (MAC) address of a source or a hostname of a source. Information field 359 may allow the specification of an endpoint thru which the request will pass. For example, a created access policy may apply only to requests which pass through an identified external endpoint. In other examples, a created access policy may apply to requests which pass through endpoints internal to the remote network, such as a publicly accessible endpoint. Information field 361 allows an action to be associated with a request which conforms to the previously discussed information fields. For example, any request which complies to the previously specified information fields may be allowed by the remote network (i.e., processed in accordance with the request). In other examples, requests which comply with specified information fields may be denied access to the remote network. In some embodiments, denied requests may be processed by returning an error message to the source of the request. A client may submit the information contained within information fields 352-361 to the remote network by selecting the submit button 362.

In some embodiments, a remote network may implement default access policies in response to requests which do not meet any client specified access policies. For example, in some embodiments, all requests which do not comply with a client specified access policy may be denied. In other examples, default access policies may differ based on the nature of the request. For example, all requests to read resources on the remote network may be allowed (in the absence of applicable client specified access policies), while all requests to modify resources may be denied. Though the above information is discussed for the purposes of example, one or more information fields 352-361 may be omitted during the creation of an access policy. In addition, further information fields not discussed above may be included in a created access policy. By way of non-limiting example, such information may include a username of the submitting entity, the time of day information is submitted, the API call used by the future access request, the authentication method used to submit the request to add access policy information, and the encryption used to add the access policy.

Figure 4:
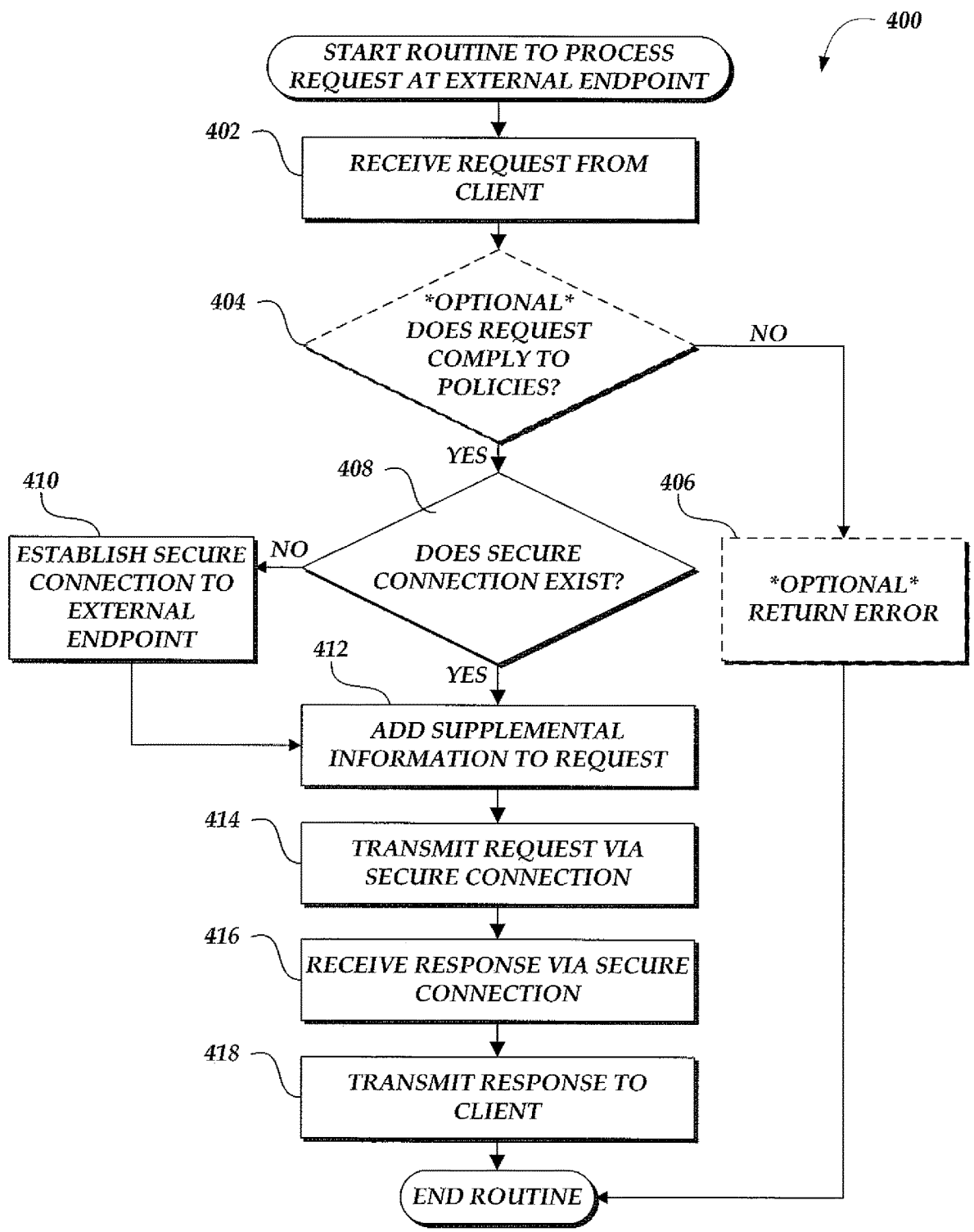
FIG. 4 is a flow diagram depicting an illustrative routine for processing a request at an external endpoint from a client computing device to a remote network.

With reference now to FIG. 4, one embodiment of a routine 400 implemented by an external endpoint 114 for processing a request from a client computing device to a remote network 120 will be described. At block 402, the external endpoint 114 receives a request to interact with the remote network 120 from a client computing device 112. As described above, this request could correspond to any request to interact with the remote network 120. By way of non-limiting example, the request may be a request to add, modify, or delete an access policy on the remote network 120 or a request to read to or write to a computing resource 126 on the remote network 122. Such a write request may include a request to create, update, or delete information within a computing resource 126. The request may further be a request to modify the configuration of the remote network 120, such as by creating a new computing resource 126 or modifying processing of further requests within the remote network 126.

At block 404, the external endpoint 114 may optionally determine whether the request conforms to the access policies of the remote network 120. This may, for example, require the external endpoint 114 have access to policy storage. This policy storage may be the policy storage 124 within the remote network 120, or may be policy storage within the client private network 110. In some embodiments, the external endpoint 114 may be operable to maintain synchronized access policies on both the client private network 110 and the remote network 120. In other embodiments, the access policies enforced by the external endpoint 114 may be supplemental to or distinct from the access policies enforced by the remote network 120. For example, the remote network 120 may include an access policy which allows all requests from the external endpoint 114. The external endpoint 114 may, in turn, include access policies only allowing requests from client computing devices 112 which authenticate with the external endpoint 114. In other embodiments, all access policies may be enforced by the remote network 120, such that the external endpoint 110 is not required to determine whether a request complies with any access policies. In these embodiments, routine 400 may omit block 404. In some embodiments, external endpoint 110 may be operable to log whether a request complies with policy information.

At block 406, if the external endpoint 114 has determined that the request does not comply with access policies, the external endpoint 114 may optionally return an error to the client computing device 112. In some embodiments, the external endpoint 114 may not return an error, but simply ignore the request. Where a request does not comply with access policies, the routine 400 will end.

If the request does comply with access policies, or if the external endpoint 114 does not test whether access policies are complied with, the routine 400 proceeds to block 408. At block 408, the external endpoint 114 verifies that a secure network connection exists between the external endpoint 114 and an internal endpoint 122 within the remote network 120. As discussed above, the secure network connection allows secure communication across a network between the external endpoint 114 and the internal endpoint 122. For example, the secure network connection may utilize a WAN or global communications network. In these examples, a method of securing a network connection is required to ensure that information within requests is not disclosed or modified. For the purposes of the present example, a VPN connection between endpoints will be assumed. As described above, other mechanisms for creating a secure network connection between endpoints may be utilized without departing from the scope of the present disclosure.

Where the external endpoint 114 determines that a secure network connection does not exist, the external endpoint 114 may, at block 410, create such a secure network connection with the remote network 110. For the purposes of the current example, creation of a secure network connection may include transmitting a request to create a VPN connection, along with additional information necessary for creating the connection, such as authentication information. In some embodiments, creation of a secure network connection may include prompting a client computing device 112 to input information necessary to create the secure network connection. Where a secure network connection cannot be established, the external endpoint 114 may return an error to the client computing device 112.

After a secure network connection is verified or established, the routine 400 may proceed to block 412. At block 412, supplemental information is determined and added to the initial client request. As describe above, the supplemental information may be used by the internal endpoint to determine routing within the remote network 120, or to determine whether a request complies with access policies of the remote network 120. For example, the supplemental information may describe characteristics of the request or of the client computing device 112, such as the port on which the request was received at the external endpoint 114 or an address of the client computing device 112. In some embodiments, the supplemental information may describe the external endpoint 114 at which the request was received.

After adding the supplemental information to the initial client request, at block 414, the external endpoint 114 transmits the supplemented request to the internal endpoint 122 within the remote network 120 via the secure network connection. Transmission of the supplemented request then allows the remote network 120 to process the request and generate a response, a routine which will be described in more detail below with respect to FIG. 5.

At block 416, after the remote network 120 generates a response to the request, the external endpoint 114 receives a response via the secure network connection. The external endpoint 114 may then generate a response for the client computing device 112. In some embodiments, the response for the client computing device 112 may be identical to the response received from the remote network 120. In other embodiments, the external endpoint 114 may modify the received response before transmitting a response to the client computing device 112. Modification of a response may occur, for example, where a client computing device 112 is unaware that the request was routed outside of the private client network 110, or where the response must be modified in order to be routed within the private client network 110.

After generating a response, at block 418, the response is transmitted to the client computing device 112 which generated the initial client request. The routine 400 may then end.

Figure 5:
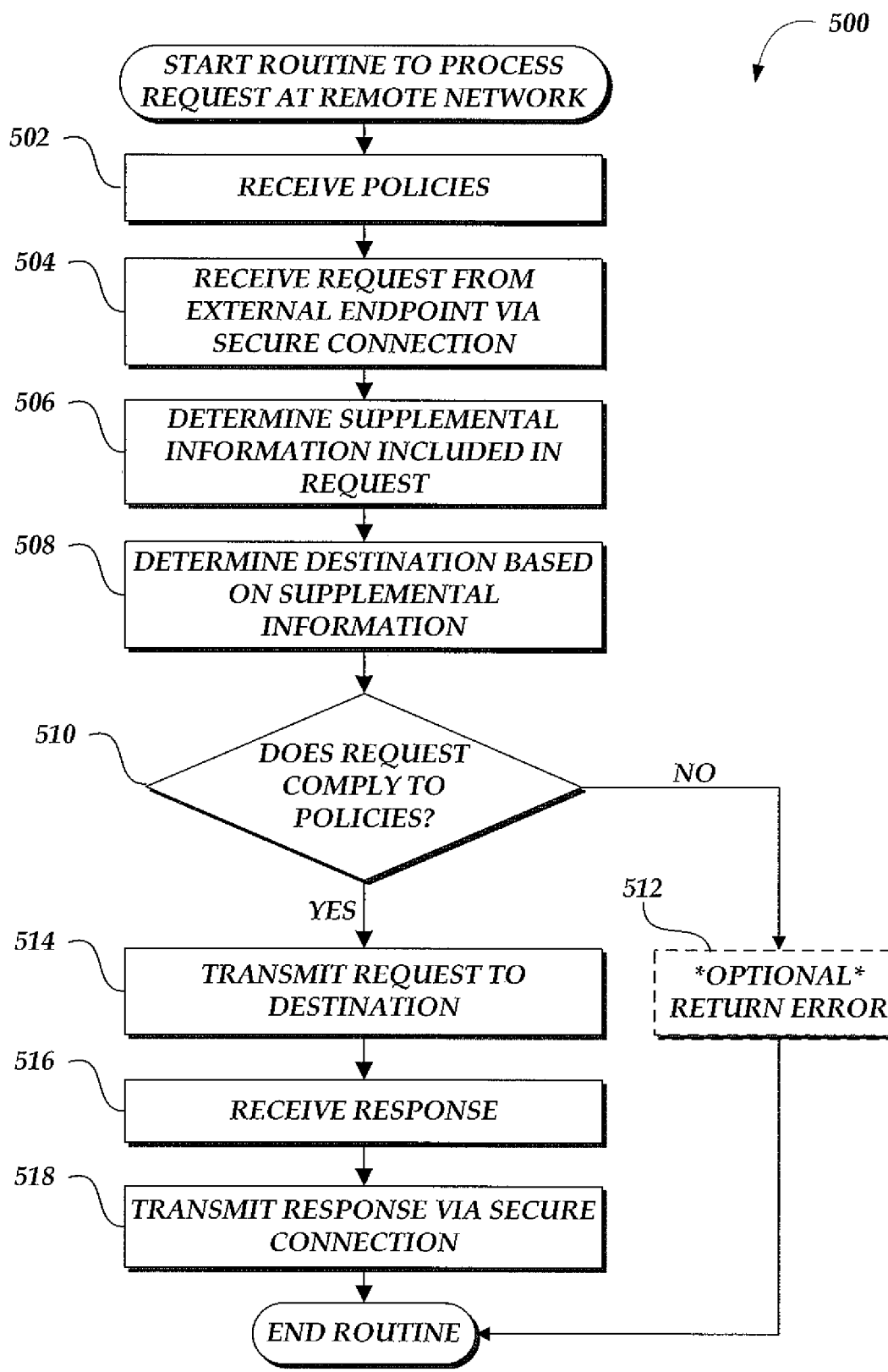
FIG. 5 is a flow diagram depicting an illustrative routine for processing a request at a remote network from a client computing device via an external endpoint.

With reference now to FIG. 5, one embodiment of a routine 500 implemented by an internal endpoint 122 for processing a request from a client computing device to a remote network 120 will be described. At block 502, the internal endpoint 122 receives access policies related to processing requests on the remote network 120 from client computing devices 112. In some embodiments, access policies may be received from a client computing device 112, such as during the interaction illustrated above with respect to FIG. 2A. In other embodiments, default access policies may be provided to an internal endpoint 112. In still more embodiments, access policies may be retrieved from a policy storage, such as the policy storage 124. Further, access policies may be received by other mechanisms, such as by client computing devices 102 which are not within the private client network 110. These client computing devices 102 may be operable to create access policies for the remote network 120, for example, where they are authenticated as being operated by the user or administrator of the remote network 120. Access polices are described in more detail with respect to FIGS. 2A and 3, above.

At block 504, the internal endpoint 122 receives a supplemented request from the external endpoint 114 via a secure network connection. At block 506, the supplemental information included within the request is determined. As described above with respect to FIG. 4, supplemental information can be added by the external endpoint 114 in order to assist routing within the remote network 120, or in order to determine compliance with the retrieved access policies.

At block 508, the internal endpoint 122 determines the appropriate destination of the request. In some embodiments, determining an appropriate destination may include processing the supplemental information with the retrieved access policies. For example, access policies may determine that all requests coming from a certain external endpoint are transmitted to a specific computing resource 126 within the remote network 120. In other embodiments, the access policies may not be required in order to determine the appropriate destination of the request. For example, the supplemental information may indicate a certain user account to which the request is directed (e.g., by identifying the source external endpoint 114, the source client computing device 112, or included authentication). The internal endpoint 122 may then determine a destination computing resource 126 within the remote network 120 as a function of that user account. Illustratively, a request from "Client 1" may be directed to "My Database Server." The internal endpoint 122 may determine, based on information of the remote network 120, that the "My Database Server" of "Client 1" is hosted by a specific computing resource 126 of the remote network 120. Further, routing may be based in part on the physical or logical design of the remote network 120. Illustratively, routing metrics may be used to determine a less congested routing path to the end destination. In some embodiments, a routing path may further be based on preferences associated with a certain user of the remote network 120. For example, a user which has a higher priority for use of the remote network 120 may receive a faster routing path to the appropriate destination.

In some embodiments, the international destination of the request may be the internal endpoint 122. This may occur, for example, where the request is a request to modify access policy information, as illustrated above with respect to FIG. 2A. In another example, the internal endpoint 122 may be configured to provide data processing functionality as a computing resource 126. In these embodiments, the determination of a destination at block 510 can include an identification of the internal endpoint 122 as the appropriate recipient of the request. Alternatively, the determination of a destination at block 508 may be omitted. Additionally, in some embodiments, the remote network 120 may be in communication with other computing devices outside of the remote network 120. In these embodiments, the appropriate destination of a request may be those computing resources outside of the remote network 120.

At block 510, the internal endpoint 122 determines whether the request complies with the retrieved access policies. Though described herein as subsequent to the determination of an appropriate destination, in some embodiments, compliance with access policies may be tested prior to determining an appropriate destination. As described above with respect to FIG. 2B, the internal endpoint 122 may use supplemental information included within the request to determine the requests compliance with access policies. For example, the supplemental information may describe the source or authentication method of the request. By processing that supplemental information with the retrieved access policies, it may be determined whether to allow the request. In some embodiments, supplemental information within the request may specify whether the request has been determined to comply with access policies by an external endpoint. In some such embodiments, the internal endpoint 122 may trust such information to determine whether the request complies with access policies. In still more embodiments, the internal endpoint 122 may be operable to log whether requests comply with access policies.

If the request does not comply with the retrieved access policies, the internal endpoint 122 may optionally return an error message at block 512. For example, an error message may indicate that the user does not have the authority to complete the requested action. In other embodiments, the internal endpoint 122 may ignore requests that do not comply with access policies. Where a request does not comply with access policies, the routine 500 then ends.

If a request does comply with access policies, the routine 500 proceeds to block 514. At block 514, the request is transmitted to the determined appropriate destination. Transmitting the request to an appropriate destination may include routing the request through additional network components. As described above, in some embodiments, the appropriate destination may be the internal endpoint 122. In these embodiments, the internal endpoint 122 processes the request locally, and may not be required to further transmit the request.

At block 516, a response to the request is received at the internal endpoint 122. Illustratively, this response could indicate that the request has been processed successfully. In other embodiments, a response could indicate that the request could not be processed, or indicate reasons for the failure to process the response. In some embodiments, requests may not require or invite a response. In these embodiments, the routine 500 may then end.

Where a response is received, the internal endpoint 122, at block 518, transmits the response to the external endpoint 114. As described with respect to FIG. 4, the response may then be returned to the client computing device 112 which generated the initial client request. The routine 500 may then end.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing access to a service hosted in a private network via an endpoint external to the private network, the system comprising:
   at least one data repository hosted within a first private network, the at least one data repository configured to store policy information specifying that a first external endpoint is authorized to interact with a service hosted on the first private network, the policy information including access rules for determining whether to allow requests to interact with the service via the first external endpoint; and
   at least one first computing device associated with an externally facing internal endpoint within the first private network, the at least one first computing device configured to at least:
      receive, from a computing device associated with a customer, a request to access the service;
      receive an acceptance corresponding to the request to access the service; and
      responsive to receiving the acceptance:
         cause, at least in part, creation of the first external endpoint external to the first private network, the first external endpoint represented by an IP address within a second private network associated with the customer; and
         cause, at least in part, storage at the at least one data repository of the policy information specifying that the first external endpoint is authorized to interact with the service;
   wherein the first external endpoint is operable to at least:
      receive a request to interact with the service, the request to interact with the service being addressed to the IP address; and
      transmit a supplemented request over a secure network connection to the externally facing internal endpoint, the supplemented request comprising the request to interact with the service and supplemental information provided by the first external endpoint, wherein the supplemental information causes, at least in part, transmission of the request to interact with the service to the service.

2. The system of claim 1, wherein the externally facing internal endpoint is further operable to at least:

receive, from a computing device associated with a second customer, a second request to access the service, the second customer associated with a third private network;

receive an acceptance corresponding to the second request to access the service; and responsive to receiving the second acceptance: cause, at least in part, creation of a second external endpoint external to the first private network, the second external endpoint represented by a second IP address within the third private network; and cause, at least in part, storage at the at least one data repository of policy information specifying that the second external endpoint is authorized to interact with the service.

3. The system of claim 1, wherein the first external endpoint comprises at least a portion of a computing resource within the second private network.

4. The system of claim 3, wherein the policy information allows interaction with the service only where the supplemented request is received from the first external endpoint.

5. The system of claim 1, wherein the request to interact with the service comprises a request to perform at least one of creating information on the service, reading information from the service, updating information on the service, deleting information on the service, and modifying a configuration of the service.

6. The system of claim 1, wherein the supplemental information includes at least one of identification information, authentication information associated with the request to interact with the service, network address information, authentication information associated with the first external endpoint, timing information of the request to interact with the service, an encryption method associated with the request to interact with the service, and destination information.

7. The system of claim 1, wherein the at least one first computing device is operable to determine whether to allow the request to interact with the service to be transmitted to the service based at least in part on the policy information and the supplemental information.

8. The system of claim 1, wherein the secure network connection is a virtual private network connection using at least one of Internet Protocol Security protocol suite and Secure Socket Layer communication protocol.

9. A method for providing access to a service hosted in a private network via an endpoint external to the private network, the method comprising:

receiving, from a computing device associated with a customer, a request to access a service hosted within a first private network;

responsive to receiving acceptance of the request to access the service:

causing, at least in part, creation of a first endpoint external to the first private network, the first endpoint represented by an IP address within a second private network associated with the customer; and storing policy information specifying that the first endpoint is authorized to interact with the service, the policy information including access rules for determining whether to allow requests to interact with the service via the first endpoint;

receiving, at the first endpoint, a request to interact with the service, wherein the request to interact with the service is addressed to the IP address; and causing, at least in part, transmission of the request to interact with the service over a secure network connection from the first endpoint to the service, wherein the request to interact with the service is transmitted as a supplemented request comprising supplemental information provided by the first endpoint.

10. The method of claim 9, wherein the first endpoint comprises at least a portion of a computing resource within the second private network.

11. The method of claim 10, wherein the policy information allows interaction with the service only where the supplemented request is received from the first endpoint.

12. The method of claim 9, wherein the request to interact with the service comprises a request to perform at least one of creating information on the service, reading information from the service, updating information on the service, deleting information on the service, and modifying a configuration of the service.

13. The method of claim 9 further comprising:

receiving, from a computing device associated with a second customer, a second request to access the service, the second customer associated with a third private network;

receiving a second acceptance corresponding to the second request to access the service; and responsive to receiving the second acceptance:

causing, at least in part, creation of a second endpoint external to the first private network, the second endpoint represented by a second IP address within the third private network; and storing second policy information specifying that the second endpoint is authorized to interact with the service, the second policy information including access rules for determining whether to allow requests to interact with the service via the second endpoint.

14. The method of claim 9, wherein the supplemental information includes at least one of an address of the computing device associated with the customer, authentication information associated with the request to interact with the service, an address of the first endpoint, authentication information associated with the first endpoint, a port over which the first endpoint received the request to interact with the service, timing information of the request to interact with the service, an API call accessed by the request to interact with the service, an encryption method associated with the request to interact with the service, and a desired destination of the request to interact with the service.

15. A non-transitory, computer-readable medium having stored thereon computer-executable software instructions configured to cause one or more processors associated with a first private network to perform operations comprising:

receiving, from a computing device associated with a customer, a request to access a service hosted within the first private network;

responsive to receiving acceptance of the request to access the service:

causing, at least in part, creation of an endpoint external to the first private network, the endpoint represented by an IP address within a second private network associated with the customer; and storing policy information specifying that the endpoint is authorized to interact with the service, the policy information including access rules for determining whether to allow requests to interact with the service via the endpoint;

receiving, at the endpoint, a request to interact with the service, wherein the request to interact with the service is addressed to the IP address; and causing, at least in part, transmission of the request to interact with the service over a secure network connection from the endpoint to the service, wherein the request to interact with the service is transmitted as a supplemented request comprising supplemental information provided by the endpoint.

16. The non-transitory, computer-readable medium of claim 15, wherein the secure network connection is a virtual private network connection.

17. The non-transitory, computer-readable medium of claim 15, wherein the secure network connection uses at least one of Internet Protocol Security protocol suite and Secure Socket Layer communication protocol.

18. The non-transitory, computer-readable medium of claim 15, wherein the supplemental information includes at least one of an address of the computing device associated with the customer, authentication information associated with the request to interact with the service, an address of the endpoint, authentication information associated with the endpoint, a port over which the endpoint received the request to interact with the service, timing information associated with the supplemented request, an original API call associated with the supplemented request, an encryption method associated with the supplemented request, and a desired destination of the supplemented request.

19. The non-transitory, computer-readable medium of claim 15, wherein the supplemented request includes at least one of a request to read information on the service, a request to write information to the service, and a request to modify the configuration of the service.

20. The non-transitory, computer-readable medium of claim 15 wherein the endpoint comprises at least a portion of a computing resource within the second private network.

* * * * *